(No Model.)
J. ANTHON.
VENEER SAWING MACHINE.
No. 557,180. Patented Mar. 31, 1896.
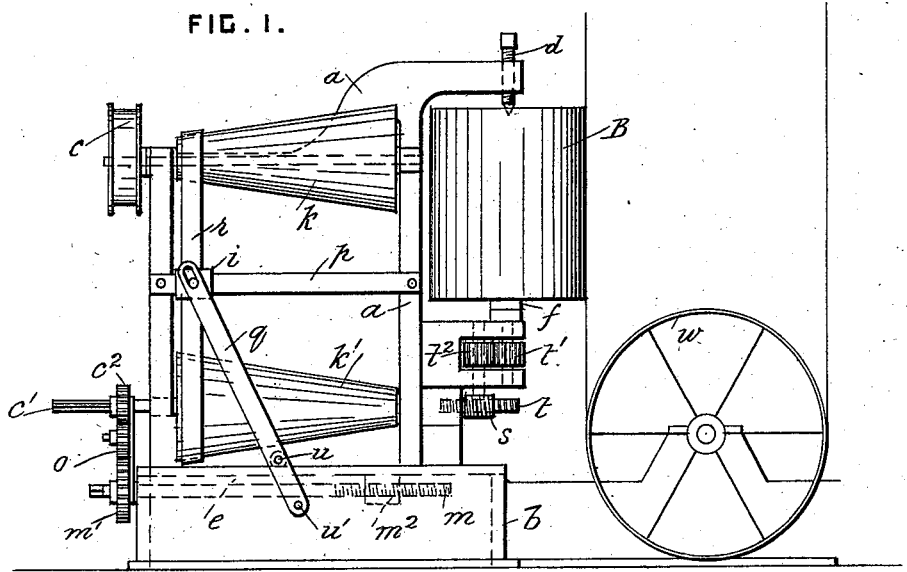
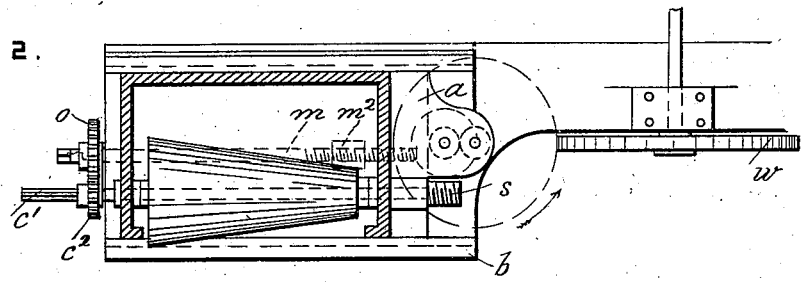
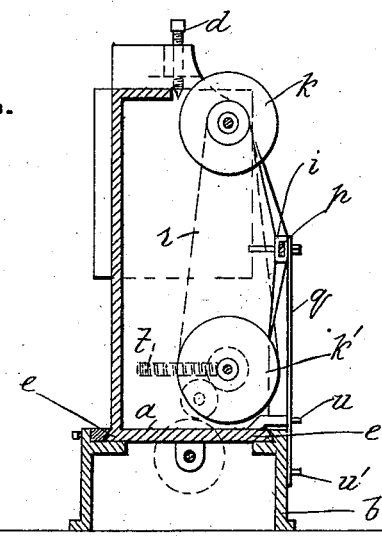
Witnesses
Inventor
Johann Anthon
By Attorney

UNITED STATES PATENT OFFICE.

JOHANN ANTHON, OF FLENSBURG, GERMANY.

VENEER-SAWING MACHINE.

SPECIFICATION forming part of Letters Patent No. 557,180, dated March 31, 1896.

Application filed October 1, 1895. Serial No. 564,286. (No model.)

*To all whom it may concern:*

Be it known that I, JOHANN ANTHON, a subject of the King of Prussia, Emperor of Germany, residing at Flensburg, in the Kingdom of Prussia, Germany, have invented certain new and useful Improvements in Veneer-Sawing Machines; and I do hereby declare the following to be a full, clear, and exact description of the invention, such as will enable others skilled in the art to which it appertains to make and use the same.

The object of my invention is to cut blocks of wood or other material spirally, by means of band, frame, or other suitable saws, into continuous sheets of any required thickness suitable for veneer and the like, for which purpose the saw is required to operate upon the block from the periphery to the center with a continually-decreasing radius, the block being caused to rotate upon its center and also carried bodily forward toward the saw while being operated upon, the speed of rotation and the carrying forward being simultaneously increased as the cut approaches the center of the block; and in order that my said invention may be particularly described and ascertained reference is hereby made to the accompanying drawings, in which similar letters of reference indicate corresponding parts.

Figure 1 is a side elevation; Fig. 2, a plan; and Fig. 3 an elevation of the left-hand end of Figs. 1 and 2, illustrating one method of carrying out my invention.

The apparatus consists of two frames, $a$ being the upper movable frame, sliding in dovetail guides $e$ formed on the stationary frame $b$. The frame $a$ carries the clamping apparatus in which the block of wood or other material B is held by means of a screwed center bolt $d$ at the upper end of the block and a chuck $f$ under the block. The chuck $f$ is fast on the spindle of the pinion $t'$, which is in gear with the pinion $t^2$, the latter being fast on the spindle of the worm-wheel $t$, which is driven by the worm $s$.

$c$ is the belt-pulley for driving the cone $k$, and $r$ is a movable belt for driving the cone $k'$ at variable speeds. The position of the belt $r$ is governed by the fork $i$, which slides on the guide $p$ and engages with the belt $r$. A lever $q$ is operatively connected with the fork $i$ and is pivoted at $u$ to the movable frame $a$ and at $u'$ to the stationary frame $b$.

The shaft $c'$ is formed with a feather sliding in a groove in the pinion $c^2$, whereby the pinion is driven, and by means of change-wheels $o$ $m'$ the wheel $m'$ and screw $m$ are driven. The screw $m$ works in a nut $m^2$ fixed to the frame $a$, whereby the position of the frame $a$, and consequently also of the block B, relatively to the saw, is controlled. $w$ is a steadying and supporting wheel for the saw, mounted in bearings attached to the frame $a$.

From the foregoing description it will be understood that the revolutions of the block B and the operation of the saw are equalized by the slower speed of the shaft $c'$ at the commencement of the cut and the increase of such speed as the diameter of the block decreases. This is effected by the position of the fork $i$ and belt $r$. The cone $k$ being driven at uniform speed, the cone $k'$ is at first driven at a slow speed by the belt $r$, and consequently the worm $s$ causes the revolution of the block B to correspond in speed; but by means of the gear $o$ and screw $m$ the frame $a$ is steadily carried forward. This movement carries the pivot $u$, lever $q$, and fork $i$ forward from the left to the right hand, whereby the belt $r$ is also shifted forward and the speed of the cone $k'$ and gear in connection therewith is correspondingly increased, in a manner well understood in relation to differential gearing.

The relative diameters of the conical pulleys $k$ and $k'$ are arranged so that the feed motion may be uniform throughout the entire cut, the revolutions and forward travel being slowest at the commencement and greatest in speed at the finish.

Having thus fully described my invention, I claim as new and desire to secure by Letters Patent—

1. In a machine for cutting veneer, the combination, with a slidable frame for supporting the log, and driving mechanism carried by the said frame, operating to revolve the log and comprising two speed-cones and a belt; of a stationary frame, feed mechanism operating to slide the slidable frame upon the stationary frame, and a belt-shifting lever pivoted to both the said frames and operating automatically to increase the speed of the revolution of the log as it is fed forward, substantially as set forth.

2. In a machine for cutting veneer, the combination, with a slidable frame for supporting the log, and driving mechanism carried by the said frame, operating to revolve the log and comprising two feed-cones and a belt; of a stationary frame, a feed-screw carried by the stationary frame, a nut carried by the slidable frame and engaging with the said screw, a toothed wheel splined on the shaft of one of the said feed-cones and operatively connected with the said feed-screw, and a belt-shifting lever pivoted to both the said frames and operating automatically to increase the speed of the revolution of the log as it is fed forward, substantially as set forth.

In testimony whereof I have affixed my signature in presence of two witnesses.

JOHANN ANTHON.

Witnesses:
   TENS HANSEN,
   WILHELM BRANDES.